R. BRIDGE.
APPARATUS FOR MANUFACTURING JOINTING MATERIAL.
APPLICATION FILED MAY 20, 1919.

1,330,054.

Patented Feb. 10, 1920.
2 SHEETS—SHEET 1.

INVENTOR
Robert Bridge

R. BRIDGE.
APPARATUS FOR MANUFACTURING JOINTING MATERIAL.
APPLICATION FILED MAY 20, 1919.
1,330,054.
Patented Feb. 10, 1920.
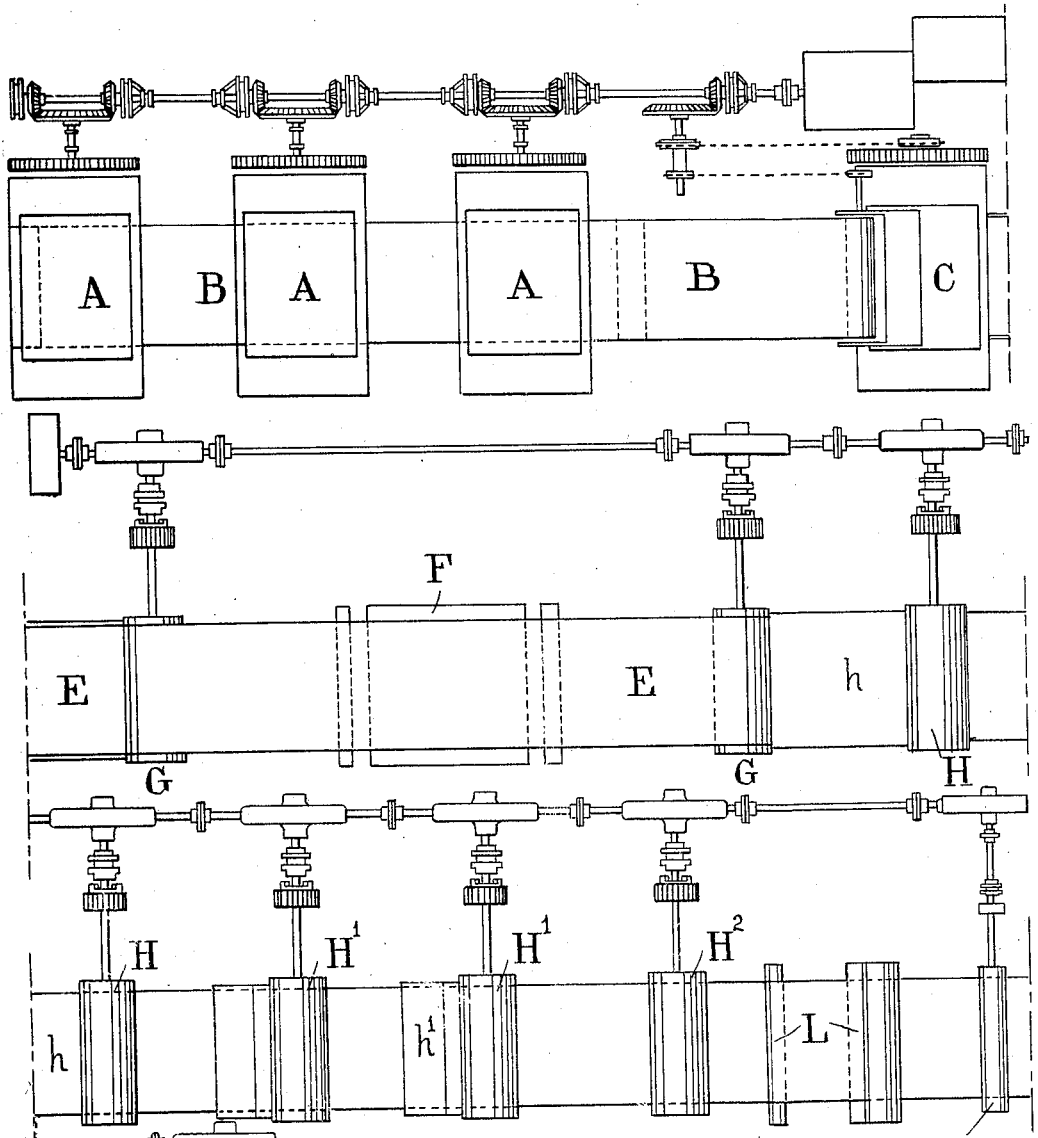
Fig. 2.
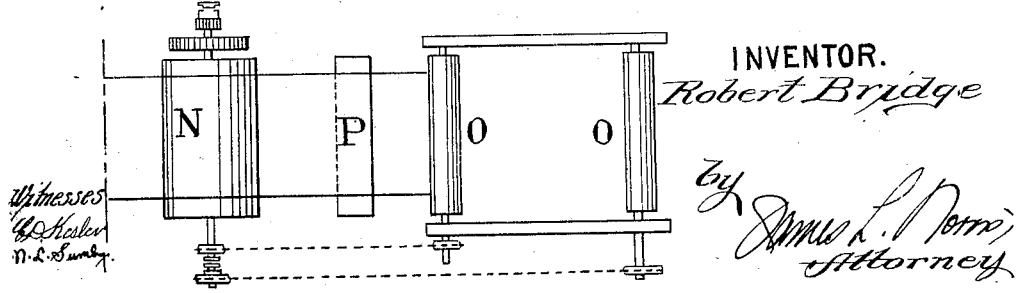
INVENTOR.
Robert Bridge

UNITED STATES PATENT OFFICE.

ROBERT BRIDGE, OF CASTLETON, ENGLAND.

APPARATUS FOR MANUFACTURING JOINTING MATERIAL.

1,330,054.  Specification of Letters Patent.  Patented Feb. 10, 1920.

Application filed May 20, 1919. Serial No. 298,459.

*To all whom it may concern:*

Be it known that I, ROBERT BRIDGE, a British subject, of Castleton, county of Lancaster, England, residing at Castleton Iron Works, Castleton, county of Lancaster, England, have invented certain new and useful Improvements in Apparatus for Manufacturing Jointing Material, of which the following is a specification.

This invention relates to apparatus for manufacturing jointing material such as is known as high pressure jointing, from rubber and asbestos fibers.

The apparatus comprises a series of mixing vessels, and distributing mixer with conveyer to carry the material to the latter, two endless conveyer bands to receive the material from the mixers and carry it forward, heated drying chests over which the material is carried between the endless conveyer bands, stripping rolls to consolidate the material and strip it from the conveyer bands, two or more pairs or sets of calendering rolls, two or more pairs or sets of surfacing calender rolls between which a surfacing material is applied to one or both faces of the material, an inspection table, marking roller to impress the material, rotary cutters to trim the edges of the material, a hauling drum over which the material is passed, a guillotine knife to cut the material transversely and batching rolls upon which the finished material is wound in the desired lengths.

The invention will be fully described with reference to the accompanying drawings.

Fig. 2 is a diagrammatic plan.

Figure 1:
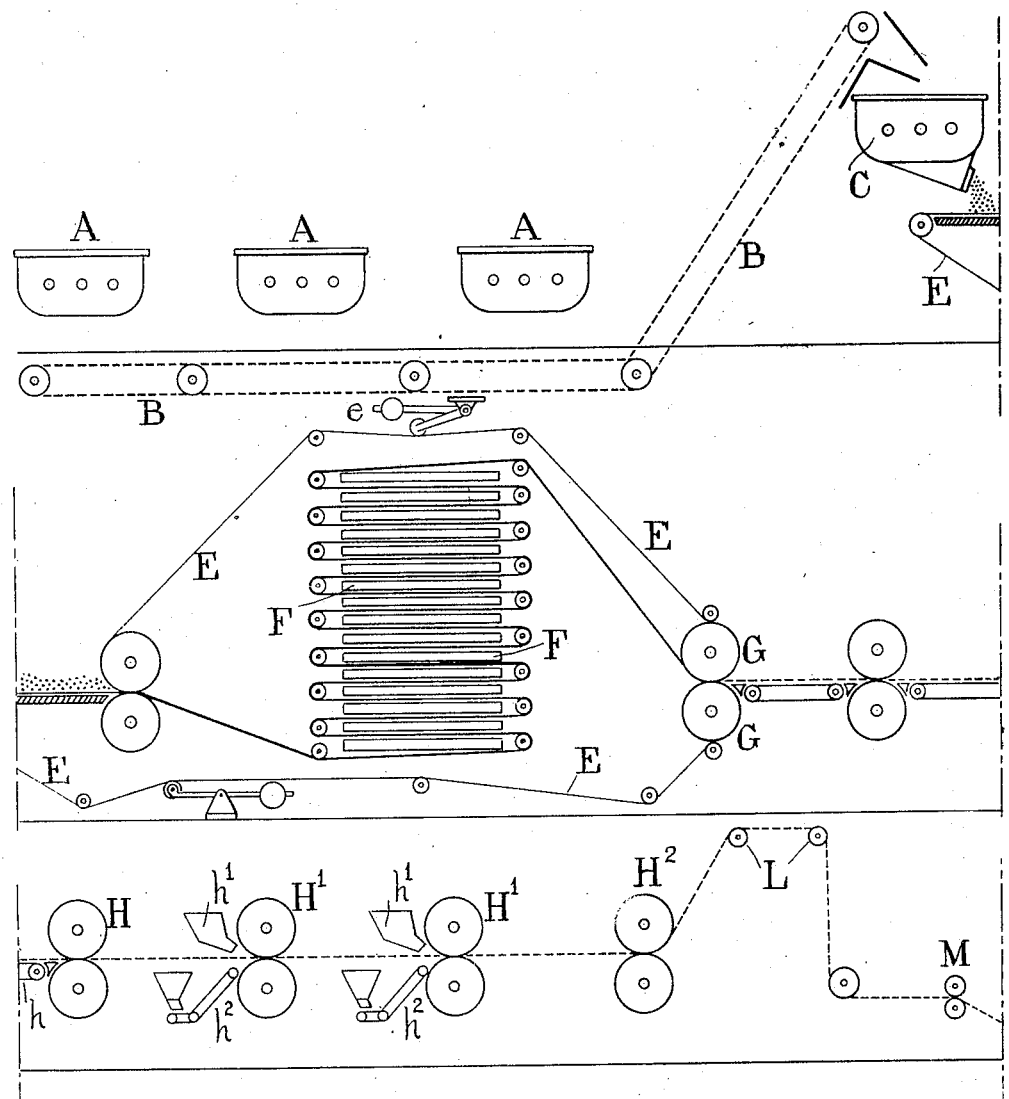
Figure 1 is a diagrammatic longitudinal section.
Figure 1:
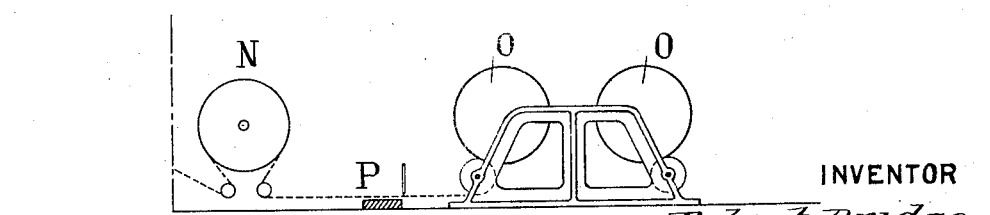

At the feed end of the apparatus a series of mixing machines A are placed in which the ordinary component materials are mixed. These mixers are preferably of the tip-over type from which the mixed material in its soft or plastic condition is tipped on to a conveyer B by which the material is transferred to a distributing mixer C in which the material from the three mixers A is mixed together and from which a given quantity of the material is automatically fed on to one of a pair of conveyer bands or blankets.

Adjacent to the mixer C a pair of spreading calender rolls D are mounted and around these, two endless conveyer bands or blankets E are passed between which the material is compressed between the rollers D and carried forward until dried and consolidated. The double endless conveyer bands between which is the material, are carrier to and fro over a series of heated chests F or other drying apparatus to drive off the solvents and dry the material. After passing over the drying chests F the endless bands pass between the two rolls G where the material is further compressed and consolidated and is stripped or released from the endless conveyer bands E. These bands are returned over guide rollers (one above and the other below the drying chests) to the front of the machine to receive a further charge of the material. The bands E are kept tight by the tension devices $e$.

Calender rolls H receive the material from the rolls G, the material being supported by conveyers $h$. Two or more pairs of surfacing rolls H' are fitted with hoppers $h'$ and the under one with a conveyer $h^2$ to apply a surfacing material to one or both faces of the material as it passes through the machine. From the surfacing rolls H' the material passes to polishing calender rolls $H^2$ which give a finished surface thereto. Above the polishing calender rolls $H^2$ are two guide rollers L over which the material passes forming an inspection table to enable easy inspection of the material on both sides.

Roller M with trade name or trade marks on the periphery receive the material after being finished and rotary cutters may be employed to trim the edges. A guillotine knife P is provided to cut off the material when any required length has been finished.

The material is drawn through the machine by the hauling drum N and wound on to alternate batching rollers O and the several parts of the apparatus are driven by suitable gearing or chain.

What I claim as my invention and desire to protect by Letters Patent is:—

Apparatus for the continuous manufacture of jointing material comprising in its construction mixing vessels in which the material is mixed and fed to the machine, a pair of endless conveyer bands to receive the material between them and carry it forward, heated drying chests over which the bands carry the material, rolls to carry the conveyer bands and consolidated material and strip it from the conveyer bands, two or more pairs or sets of calendering rolls, hoppers adjacent thereto to apply a surfacing material to both faces of the material, an inspection table, with rollers over which the material passes, marking rollers to impress the material with trade mark or trade name, a hauling drum, guillotine knife and batching rolls upon which the finished material is wound in the desired length substantially as described.

In testimony whereof I have hereunto set my hand in presence of two subscribing witnesses, this 1st day of May, 1919.

ROBERT BRIDGE.

Witnesses:
 GEO. H. O'BRIEN,
 T. W. ANDREW.